US 8,553,855 B2

(12) United States Patent
Ueno et al.

(10) Patent No.: US 8,553,855 B2
(45) Date of Patent: Oct. 8, 2013

(54) CONFERENCE SUPPORT APPARATUS AND CONFERENCE SUPPORT METHOD

(75) Inventors: Kouji Ueno, Kanagawa-ken (JP); Nobuhiro Shimogori, Kanagawa-ken (JP); Tomoo Ikeda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 201 days.

(21) Appl. No.: 13/232,314

(22) Filed: Sep. 14, 2011

(65) Prior Publication Data

US 2012/0154514 A1 Jun. 21, 2012

(30) Foreign Application Priority Data

Dec. 17, 2010 (JP) ................................ P2010-282152

(51) Int. Cl.
*H04M 11/00* (2006.01)
(52) U.S. Cl.
USPC ..................................... 379/88.14; 379/93.17
(58) Field of Classification Search
USPC ........... 379/93.21, 93.17, 158, 202.01, 88.05, 379/88.11, 88.13, 88.14; 348/14.01, 14.08; 704/1, 2, 4, 200
See application file for complete search history.

(56) References Cited

U.S. PATENT DOCUMENTS

| 6,816,468 | B1 * | 11/2004 | Cruickshank | 370/260 |
| 7,991,801 | B2 * | 8/2011 | Chen et al. | 707/803 |
| 2007/0143103 | A1 * | 6/2007 | Asthana et al. | 704/200 |
| 2010/0194979 | A1 * | 8/2010 | Blumenschein et al. | 348/468 |

FOREIGN PATENT DOCUMENTS

| JP | 2003-345379 | 12/2003 |
| JP | 2005-286969 | 10/2005 |
| JP | 2008-061060 | 3/2008 |

* cited by examiner

*Primary Examiner* — Olisa Anwah
(74) *Attorney, Agent, or Firm* — Turocy & Watson, LLP

(57) ABSTRACT

A conference support apparatus for supporting a conference held between at least two terminals, includes: a delay unit configured to delay first voice data obtained by one of the terminals, in accordance with a delay caused by an information extraction processing performed on the first voice data; and a delay information video generation unit configured to generate a delay information video obtained by visualizing information about the delay of the first voice data that is delayed by the delay unit.

20 Claims, 12 Drawing Sheets

| TIME INFORMATION | FIRST VOICE DATA (DIGITAL FORMAT) |
|---|---|
| 0 | B6 FF FD FF 1D 00 4F 00 8B 00 CB 00 FF 00 25 01 ... |
| 10 | 4D 01 82 01 C0 01 F7 01 26 02 51 02 7F 02 AE 02 ... |
| 20 | DD 02 09 03 38 03 69 03 9B 03 C7 03 ED 03 11 04 ... |
| 30 | 38 04 60 04 B5 04 A6 04 CA 04 EE 04 10 05 2D 05 ... |

FIG. 4

| CAPTION ID | SPEECH START TIME | SPEECH END TIME | RECOGNITION END TIME | CAPTION DATA |
|---|---|---|---|---|
| 0 | 3 | 8 | 9 | Ok, guys. Let's begin. |
| 1 | 11 | 16 | 18 | Mike, please tell us about your recent marketing report. |
| 2 | 17 | 28 | 31 | Thank you, Tom. My staff found very interesting results in our research process of South America market. It's a main topic. |
| 3 | 29 | 32 | 40 | But first, I will show our status report as usual. |

FIG. 5

| CAPTION ID | REPRODUCTION START TIME | REPRODUCTION END TIME | CAPTION DATA | VOICE DATA |
|---|---|---|---|---|
| 0 | 9 | 14 | Ok, guys. Let's begin. | FF 03 25 B6 ED FF 1D 4F ⋯ |
| 1 | 18 | 23 | Mike, please tell us about your ⋯ | 01 26 02 51 02 7F 02 AE ⋯ |
| 2 | 31 | 40 | Thank you, Tom. My staff found very interesting ⋯ | DD 02 09 03 38 03 69 03 9B 03 C7 03 ED 03 11 04 ⋯ |
| 3 | 40 | 43 | But first, I will show our status report as usual. | A6 04 CA 04 EE 04 10 05 2D 05 ⋯ |

FIG. 6

| CAPTION ID | REPRODUCTION START TIME | REPRODUCTION END TIME | SPEECH START TIME | SPEECH END TIME | START TIME DELAY AMOUNT | END TIME DELAY AMOUNT | CAPTION DATA |
|---|---|---|---|---|---|---|---|
| 0 | 9 | 14 | 3 | 8 | 6 | 6 | Ok, guys. Let's begin. |
| 1 | 18 | 23 | 11 | 16 | 7 | 7 | Mike, please tell us about your ⋯ |
| 2 | 31 | 40 | 17 | 28 | 14 | 12 | Thank you, Tom. My staff found very interesting ⋯ |
| 3 | 40 | 43 | 29 | 32 | 11 | 11 | But first, I will show our status report as usual. |

FIG. 8

CONFERENCE SUPPORT APPARATUS AND CONFERENCE SUPPORT METHOD

CROSS-REFERENCE TO RELATED APPLICATION

This application is based upon and claims the benefit of priority from Japanese Patent Application No. P2010-282152, filed on Dec. 17, 2010; the entire contents of which are incorporated herein by reference.

FIELD

Embodiments herein generally relate to a conference support apparatus and a conference support method.

BACKGROUND

A conference support apparatus has been developed to support attendances at a conference to better understand the contents of speeches by generating caption data from the speeches spoken by the attendances. For example, there is a system for automatically generating caption data by performing voice recognition on speeches spoken by a plurality of speakers. There has been suggested a method for eliminating delay of caption data caused by information extraction processing such as voice recognition by correcting display timing of the caption data with respect to video/audio. Further, there has also been suggested a method for recognizing voice spoken by a person who reads back voice spoken by a speaker and displaying a video of the speaker as well as caption data while delaying the video of the speaker, and there has been suggested a method for conducting conference while checking the amount of delay caused by data communication on a screen.

However, even with the above techniques, it is impossible for an attendant at a conference to recognize the amount of delay that another attendant at the conference suffers due to information extraction processing such as voice recognition.

BRIEF DESCRIPTION OF THE DRAWINGS

FIG. 4 is a figure illustrating first voice data of a conference support apparatus according to the first embodiment;

FIG. 5 is a figure illustrating a processing result of a voice recognition unit in the conference support apparatus according to the first embodiment;

FIG. 6 is a figure illustrating delay reproduction data of the conference support apparatus according to the first embodiment;

FIG. 8 is a figure illustrating delay information of the conference support apparatus according to the first embodiment;

DETAILED DESCRIPTION

In view of the above circumstances, a conference support apparatus capable of allowing an attendance to easily understand the situation of another attendance at a conference and allowing smooth proceedings of the conference is provided.

A conference support apparatus according to an aspect of one embodiment is a conference support apparatus for supporting a conference held between at least two terminals.

A conference support apparatus further includes a delay unit configured to delay first voice data obtained by one of the terminals, in accordance with a delay caused by an information extraction processing performed on the first voice data; and a delay information video generation unit configured to generate a delay information video obtained by visualizing information about the delay of the first voice data that is delayed by the delay unit.

Embodiments of the present invention will be hereinafter explained with reference to drawings.

First Embodiment

Figure 1:
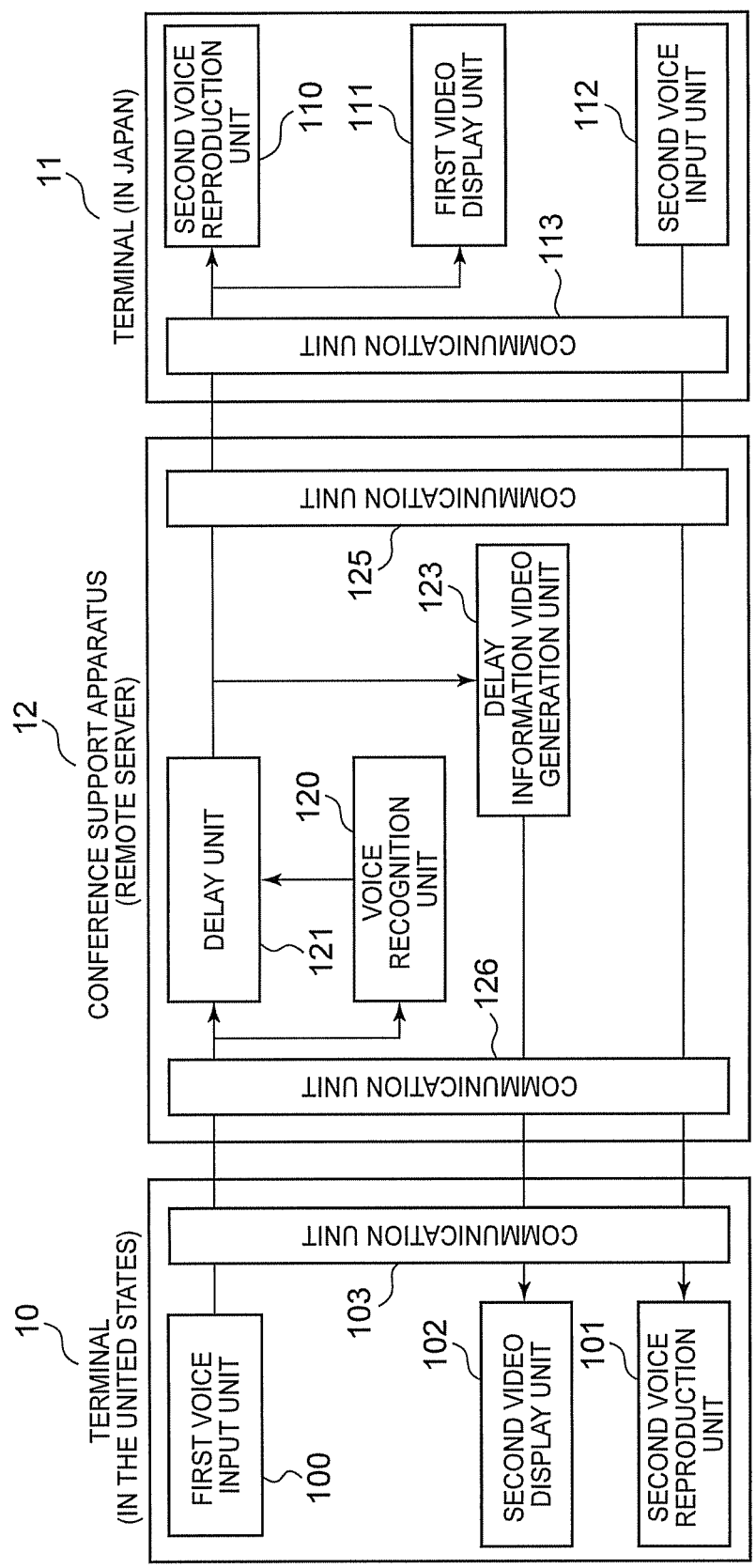
FIG. 1 is a block diagram illustrating a configuration of a conference system according to a first embodiment.

FIG. 1 is a block diagram illustrating a configuration of a conference system according to the first embodiment. A conference system according to the first embodiment is assumed to be used in a remote telephone conference between Japan and the United States. This conference system includes a terminal 10 arranged in the United States and a terminal 11 arranged in Japan, and the terminal 10 and the terminal 11 are respectively connected via a communication circuit to a remote server having a conference support apparatus 12 arranged in Japan, for example. In this case, attendances in the United States are assumed to speak English, and the conference support apparatus 12 causes the terminal 11 to display caption data in English obtained as a result of voice recognition of the speeches made in the United States, so that the conference support apparatus 12 supports attendances in Japan. At this occasion, the conference support apparatus 12 provides the voice data to the terminal 11 while delaying the voice data according to the delay caused by the voice recognition. This enables the terminal in Japan to correct displacement of synchronization between the voice data and the caption data. In addition, the conference support apparatus 12 generates a video expressing the amount of delay caused by the voice recognition, and provides the video expressing the amount of delay to the terminal 10. Accordingly, the terminal 10 can display, as the video, information about the delay of the voice data sent from the United States. This supports the attendances in the United States to understand the information about the amount of delay occurring in Japan. In the present embodiment, the attendances in Japan are also assumed to speak English, and the terminal 10 in the United Sates reproduces the voices in Japan that are input to the terminal 11 in Japan.

The terminal 10 in the United States includes a first voice input unit 100, a second voice reproduction unit 101, a second video display unit 102, and a communication unit 103. The terminal 11 in Japan includes a first voice reproduction unit 110, a first video display unit 111, a second voice input unit 112, and a communication unit 113. The conference support apparatus 12 arranged in the remote server includes a voice recognition unit 120, a delay unit 121, a delay information video generation unit 123, a communication unit 125, and a communication unit 126.

Figure 2:
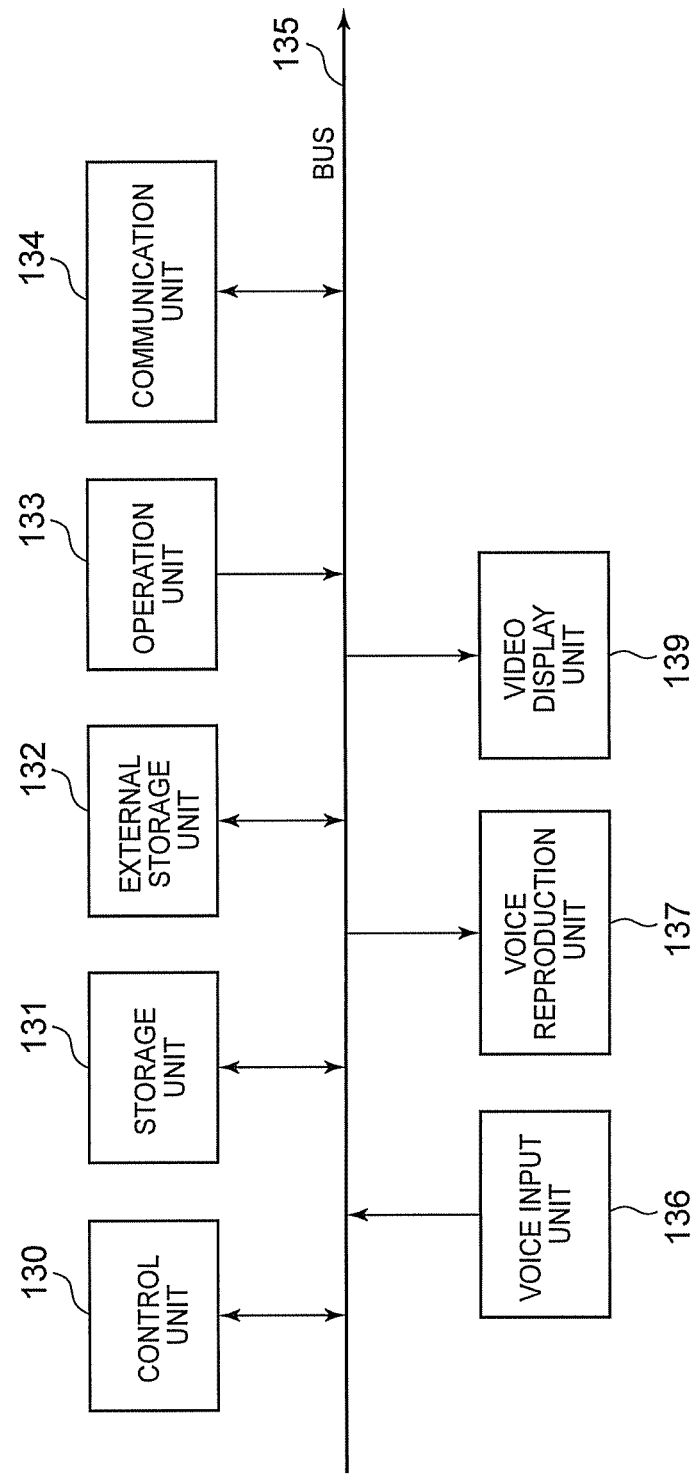
FIG. 2 is a figure illustrating a hardware configuration of a conference support apparatus according to the first embodiment.

The terminal 10 in the United States, the terminal 11 in Japan, and the conference support apparatus 12 are made with hardware using ordinary computers as shown in FIG. 2, and include a control unit 130 such as a CPU (Central Processing Unit) controlling the entire apparatus, a storage unit 131 such as a ROM (Read Only Memory) and a RAM (Random Access Memory) storing various kinds of data and various programs, an external storage unit 132 such as an HDD (Hard Disk Drive) and a CD (Compact Disk) drive device storing various kinds of data and various programs, an operation unit 133 such as a keyboard and a mouse for receiving an instruction input from a user, a communication unit 134 controlling communication with an external apparatus, and a bus 135 connecting the control unit 130, the storage unit 131, the external storage unit 132, the operation unit 133, and the communication unit 134. Further, each of the terminal 10 and the terminal 11 is connected, via a wire or wirelessly, with a voice input unit 136 such as a microphone to which voice is input, a voice reproduction unit 137 such as a speaker for reproducing voice, and a video display unit 139 such as a display for displaying video.

In such hardware configuration, the control unit 130 executes various kinds of programs stored in the storage unit 131 such as a ROM and the external storage unit 132, there by achieving the following functions.

First, a function for causing the terminal 11 in Japan to reproduce the voice data as well as the caption data in the United States will be explained. In FIG. 1, the first voice input unit 100 of the terminal 10 in the United States has a microphone (not shown), and obtains, as first voice data, speeches spoken by the attendances in the United States. The obtained first voice data are transmitted via the communication unit 103 to the conference support apparatus 12 provided in the remote server. The voice recognition unit 120 performs voice recognition on the first voice data obtained via the communication unit 126, and generates caption data of speeches spoken by the attendances in the United States in English. The language recognized by the voice recognition unit 120 can be defined in advance by the attendances. The delay unit 121 delays the first voice data according to the delay caused by the voice recognition, thereby correcting the displacement of synchronization between the caption data and the first voice data. The first voice data are delayed by once buffering the voice data and generating a pair of the buffered voice data and the caption data corresponding thereto. In this case, the amount of delay caused by the voice recognition is calculated from the processing result of the voice recognition unit 120. The caption data and the first voice data whose displacement of synchronization has been corrected are transmitted via the communication unit 125 to the terminal 11. Then, the first voice data are reproduced by a speaker (not shown) of the first voice reproduction unit 110, and the caption data are displayed on a display (not shown) of the first video display unit 111. In the present embodiment, the delay resulting from communication between the terminals is not taken into consideration.

Subsequently, a function for causing the terminal 10 in the United States to display information about the delay caused by the voice recognition (delay information) will be explained. The delay unit 121 of the conference support apparatus 12 provided in the remote server extracts delay information including the amount of delay of the first voice data. The delay information video generation unit 123 generates a delay information video that is made by visualizing the delay information extracted by the delay unit 121. The delay information video is transmitted via the communication unit 126 to the terminal 10, and is displayed on a display (not shown) of the second video display unit 102. Further, the conference support apparatus 12 transmits the second voice data obtained by the second voice input unit to the terminal 10, so that the second voice data are reproduced by a speaker (not shown) of the second voice reproduction unit 101.

Operation of the conference system according to the first embodiment having the above configuration will be explained. The conference system according to the present embodiment generates the caption data by performing voice-recognition on the first voice data spoken in the United States. Then, the first voice data are delayed according to the delay caused by the voice recognition, and the delayed first voice data are reproduced in Japan, so that the displacement of synchronization between the first voice data and the caption data is corrected. In addition, the amount of delay of the first voice data is displayed as the video in the United States, whereby the delay information such as the amount of delay occurring in Japan is notified to the attendants in the United States.

Figure 3:
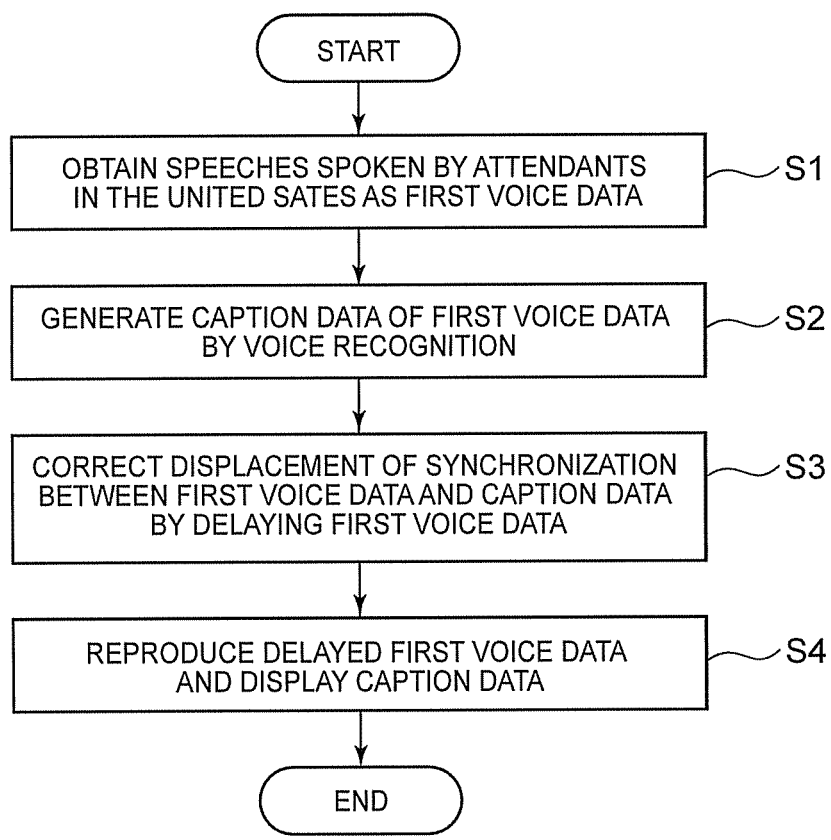
FIG. 3 is a flowchart illustrating a flow of processing performed by the conference system according to the first embodiment.

FIG. 3 is a flowchart illustrating a flow of processing when the terminal 11 reproduces the caption data as well as the first voice data of the United States. The first voice input unit 100 of the terminal 10 obtains speeches spoken by the attendants as the first voice data. In this case, the first voice data are converted from analog format to digital format, and time information is attached to the first voice data with a regular interval of time (step S1). FIG. 4 illustrates first voice data to which time information is attached. In FIG. 4, an elapsed time since the start of a conference is used as the time information, and the time information is attached every ten seconds. It should be noted that any expression such as standard time may be used as the time information.

The voice recognition unit 120 generates caption data by performing voice recognition on the first voice data obtained by the first voice input unit 100 (step S2). The voice recognition unit 120 outputs, as a processing result, caption data, i.e., a character string obtained as a result of recognition, in English, a speech start time, a speech end time, and a recognition end time of the recognized first voice data. FIG. 5 illustrates a processing result generated by the voice recognition unit 120. The processing result includes a caption ID, a speech start time, a speech end time, a recognition end time, and caption data (character string indicating recognition result). The caption ID is a unique identification number for identifying the caption data. The speech start time and the speech end time expresses a start time and an end time of a speech corresponding to each piece of caption data. The speech start time and the speech end time are represented as elapsed times since the start of conference. The caption data include a character string expressing a result obtained by recognizing the content of the speech. In this example, a speech, "Ok, guys. Let's begin.", was spoken in the United States three to eight seconds after the start of conference. It should be noted that the speech start time and the speech end time can be identified by a voice section detection function of the voice recognition. The recognition end time expresses a time at which the recognition processing on each speech is finished. The recognition end time is represented as an elapsed time since the start of conference. In FIG. 5, the recognition processing performed on the speech, "Ok, guys. Let's begin.", was finished nine seconds after the start of conference.

The delay unit 121 synthesizes a pair of first voice data and caption data to correct displacement of synchronization between the first voice data and the caption data caused by the recognition (step S3). More specifically, the delay unit 121 collates the first voice data obtained by the first voice input unit 100 with the processing result (the caption ID, the speech start time, the speech end time, the recognition end time, and the caption data) of the voice recognition unit 120, and synthesizes delay reproduction data. FIG. 6 illustrates an example of synthesized delay reproduction data. The delay reproduction data includes the first voice data held in the delay unit 121 and the caption data generated by the voice recognition unit 120, which are associated with the caption ID. The delay reproduction data includes a reproduction start time and a reproduction end time when the first voice data are reproduced in Japan. The reproduction start time expresses a time at which reproduction of the voice data is started. The reproduction start time is represented as an elapsed time since the start of conference. In the present embodiment, the reproduction start time is set as the same value as the recognition end time included in the processing result of the voice recognition unit 120. In other words, the voice data corresponding to each caption ID is reproduced as soon as the voice recognition unit 120, finishes the recognition processing. The reproduction end time expresses a time at which reproduction of each piece of voice data is finished. The reproduction end time is represented as an elapsed time since the start of conference. The reproduction end time is a value obtained by adding the length of the voice data corresponding to each caption ID to the reproduction start time except that the reproduction speed is converted. The length of the voice data can be calculated from a difference between the reproduction start time and the reproduction end time of the processing result provided by the voice recognition unit 120. The method for delaying the first voice data and converting the reproduction speed will be explained later. When FIGS. 5 and 6 are compared, it is understood that, for example, although a speech, "Mike, please tell us . . . ", having a caption ID 1 was spoken eleven seconds after the start of conference in the United States, it was reproduced eighteen seconds after the start of conference in Japan.

The synthesizing process of the first voice data and the caption data in the delay unit 121 corresponds to the delaying process of the first voice data. The first voice data and the caption data can be synthesized by buffering the first voice data for a predetermined period of time. First, the delay unit 121 buffers the obtained first voice data until the delay unit 121 obtains the processing result from the voice recognition unit 120. Then, after the processing result for each speech is obtained from the voice recognition unit 120, the reproduction start time is calculated in view of the recognition end time and the speech start time included in the processing result. Then, voice data of a section corresponding to each speech are cut out from the buffered voice data, and delay reproduction data including the caption data and the voice, data cut out from the buffered voice data are synthesized. The reproduction start time of the delay reproduction data is determined in view of the time taken in the voice recognition process. In the present embodiment, the reproduction start time is set as the same time as the recognition end time, and therefore, the delay unit 121 outputs the delay reproduction data of each speech as soon as the voice recognition unit 120 finishes the recognition processing.

Subsequently, the conversion of the reproduction speed of the first voice data will be explained. The delay unit 121 can increase the reproduction speed of the first voice data to, e.g., 1.3 times speed, in order to reduce the amount of delay caused by the voice recognition. The conversion of the reproduction speed can be achieved using a speech speed conversion technique used in a time-shift playback or chasing playback of a home HDD recorder. For example, in FIG. 6, the reproduction speed of the speech of the caption ID 2 is set at 11/9 times speed, and when it is reproduced in Japan, the voice section length is reduced from 11 seconds (length from the speech start time to the speech end time of FIG. 5) to 9 seconds (length from the reproduction start time to the reproduction end time of FIG. 6). In addition, the delay unit 121 can also reduce the amount of delay by deleting silent sections included in the section from the start to the end of each speech. The silent sections can be deleted by calculating a power of voice data in a section from speech-start to speech-end and deleting sections having powers less than a threshold value. Alternatively, the delay unit 121 may reduce the reproduction speed of the first voice data to, e.g., 0.8 times speed, so that it becomes easier for the attendances in Japan to listen to the speeches in English.

The first voice reproduction unit 110 of the terminal 11 extracts the first voice data from the delay reproduction data synthesized by the delay unit 121, and reproduces the first voice data with a speaker (step S4). The first video display unit 111 extracts the caption data from the delay reproduction data synthesized by the delay unit 121, and displays the caption data on the display (step S4). As a result of the above processing, with the conference system according to the first embodiment, the first voice data of the United States as well as the caption data can be reproduced by the terminal 11 in Japan while the first voice data are in synchronization with the caption data.

Figure 7:
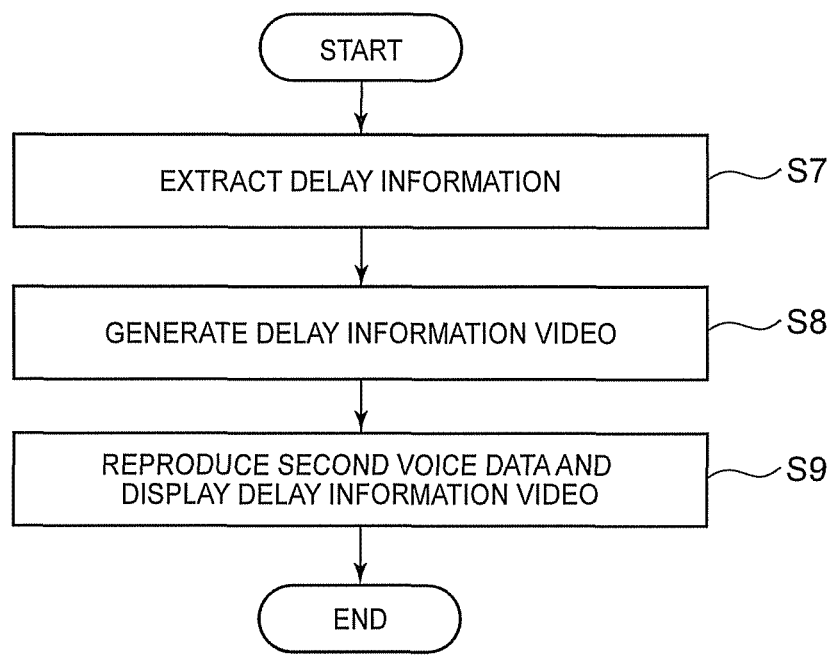
FIG. 7 is a flowchart illustrating a flow of processing performed by the conference system according to the first embodiment.

FIG. 7 illustrates a flow of processing when the terminal 10 in the United States displays the amount of delay caused by the voice recognition. The delay unit 121 extracts delay information including the amount of delay of the first voice data (step S7). FIG. 8 illustrates an example of delay information extracted from the delay reproduction data. In this case, the delay information includes a start time delay amount and an end time delay amount, and further includes a caption ID, a reproduction start time, a reproduction end time, a speech start time, a speech end time, and caption data. Among them, the reproduction start time and the reproduction end time can be directly generated by the delay reproduction data synthesized by the delay unit 121. The caption ID, the caption data, the speech start time, and the speech end time can be obtained from the processing result (FIG. 5) of the voice recognition unit 120 input to the delay unit 121. On the other hand, the start time delay amount and the end time delay amount can be calculated from the following expressions (1) and (2).

$$\text{Start time delay amount} = \text{reproduction start time} - \text{speech start time} \quad (1)$$

$$\text{End time delay amount} = \text{reproduction end time} - \text{speech end time} \quad (2)$$

By using the above extraction method, even when the amount of delay caused by the voice recognition increases/decreases for each piece of caption data, the amount of delay can be calculated correctly. Further, the amount of delay can be calculated correctly even when the reproduction speed of the voice is converted, e.g., in chasing reproduction. In the present embodiment, the delay information includes information other than the amount of delay. However, when the delay information video generation unit 123 does not need any information other than the amount of delay, e.g., the delay information video generation unit 123 generates delay information video in a time bar format explained later, only the amount of delay may be extracted as the delay information.

Figure 9:
FIG. 9 is a figure illustrating delay information video in a caption format of karaoke-type in the conference support apparatus according to the first embodiment.

The delay information video generation unit 123 generates a delay information video for the attendances in the United States that is made by visualizing the delay information extracted by the delay unit 121 (step S8). The delay information video may be either a still picture or a motion picture. An example of visualization method used by the delay information video generation unit 123 includes a Karaoke-type caption format as shown in FIG. 9. For the attendances in the United States, this indicates "the content of the speeches spoken by themselves in the past and currently reproduced in Japan". More specifically, a reproduction portion of the first voice data is displayed in the video of the processing result (caption data) of the voice recognition unit 120. The border line 900 in FIG. 9 represents a reproduction portion of the first voice data that is currently reproduced in Japan. The border line 900 can be easily generated from the caption data, the reproduction start time, and the reproduction end time stored in the delay information, and the current time information (elapsed time since the start of conference). The display portion of the border line 900 corresponding to each speech is controlled according to the ratio of the reproduction of the voice data calculated from the following expression (3).

$$(\text{Current time information}-\text{reproduction start time})/(\text{reproduction end time}-\text{reproduction start time})\times 100 \quad (3)$$

For example, when the current time information is 21 seconds during reproduction of the first voice data corresponding to ID 1 as shown in FIG. 8, the border line 900 is displayed at a position of a ratio indicated by the following expression (4) from the left of the displayed caption character strings.

$$(21-18)/(23-18)\times 100 = 60.0\% \quad (4)$$

The border line 900 in FIG. 9 shifts to the right according to the current time information. In FIG. 9, the colors of the background and the character strings in the caption data are changed at the right and left of the border line. Alternatively, the following visualization methods may also be possible. The border line 900 may not be provided, the colors may not be changed, and the sizes of the characters may be changed at the right and left of the border line 900. As described above, every time the delay unit 121 outputs the delay reproduction data for each speech, the delay information video generation unit 123 generates a motion picture in the Karaoke-type caption format for the speech.

Figure 10:
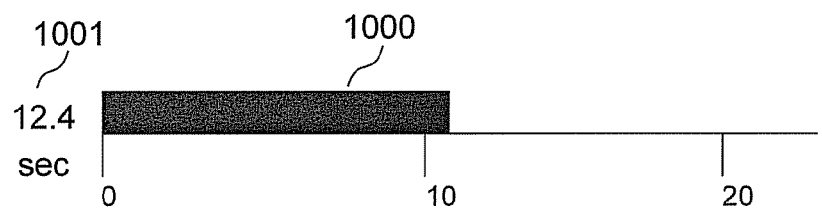
FIG. 10 is a figure illustrating delay information video in a time bar format in the conference support apparatus according to the first embodiment.

Another visualization method includes a time bar format as shown in FIG. 10. A time bar 1000 in FIG. 10 shows the current amount of delay in the delay information as a length of the time bar (length from the left side to the right side). The position of the left side of the time bar is fixed, and the length of the time bar increases/decreases (the position of the right side changes) according to the amount of delay represented in seconds. The current amount of delay can be calculated from the following expression (5).

$$\text{Start time delay amount}-(\text{current time information}-\text{reproduction start time})/(\text{reproduction end time}-\text{reproduction start time}))\times(\text{start time delay amount}-\text{end time delay amount}) \quad (5)$$

When the current time information is 38 seconds during reproduction of the first voice data corresponding to ID 2 as shown in FIG. 8, the amount of delay is calculated from the following expression (6).

$$14-((38-31)/(40-31))\times(14-12)=12.44\ldots(\text{seconds}) \quad (6)$$

A character string 1001 in FIG. 10 displays the current amount of delay in seconds.

In the present embodiment, the delay information video generation unit 123 obtains the processing result of the voice recognition such as the caption data from the delay unit 121. Alternatively, the processing result may be directly obtained from the voice recognition unit 120.

Finally, the second video display unit 102 causes the display in the United States to display the delay information video representing the amount of delay generated by the delay information video generation unit 123 (step S9). The second voice reproduction unit 101 causes the speaker in the United States to reproduce the speeches spoken by the attendances in Japan that are obtained as the second voice data (step 9). According to the above processing, the conference system according to the first embodiment can cause the terminal 10 to display the delay information such as the amount of delay caused by the voice recognition.

As described above, in the conference system according to the first embodiment, the attendances in the United States can see the delay information video displayed on the terminal 10 to find the delay information such as the amount of delay occurring in Japan due to the voice recognition. Therefore, the attendances in the United States can check the situation in Japan, and the conference proceeds smoothly.

In the conference system according to the first embodiment, the terminal 10 displays the caption data of the speeches which the attendances in Japan currently listens to. Thus, the attendances in the United States can find information about the delay, e.g., which speech spoken by the attendances in the United States the attendances in Japan are now reacting to, so that the conference proceeds smoothly.

(Modification 1)

In the conference system according to the first embodiment, the voice recognition is used as the information extraction processing, and the caption data are generated from the first voice data. In this case, information extraction processing is not limited to the voice recognition. For example, the information extraction processing may include not only the voice recognition but also generation of caption data in Japanese using English-to-Japanese machine translation. Alternatively, information processing for recognizing emotion from the first voice data in the United States may be applied, so that images representing delight, anger, sorrow and pleasure, and affirmation or negation may be displayed in Japan. In this case, the delay information video generation unit 123 visualizes the delay information about the amount of delay caused by the emotion recognition.

In the conference system according to the first embodiment, the conference support apparatus 12 is provided in the remote server. Alternatively, the function of the conference support apparatus 12 may be provided in the terminal 10 or the terminal 11. In this case, the remote server is unnecessary, and the terminals in the United States and Japan directly exchange data via the communication units. On the other hand, there may be three or more terminals that participate in the conference.

For instance, in the conference support system, said delay unit of the conference support system may be provided in a remote server, said first voice input unit may be provided in a first terminal and the obtained first voice data in the first terminal may be transmitted via a communication unit to the remote server.

Additionally, said delay unit, said extract unit and said delay information video generation unit of the conference support system may be provided in the first terminal and the delay information video may be displayed in the first terminal.

In addition, said delay unit, said extract unit and said delay information video generation unit of the conference support system may be provided in a second terminal and the delay information video generated by said delay information video generation may be transmitted to the first terminal and the transmitted delay information video may be displayed in the first terminal.

(Second Modification)

Figure 11:
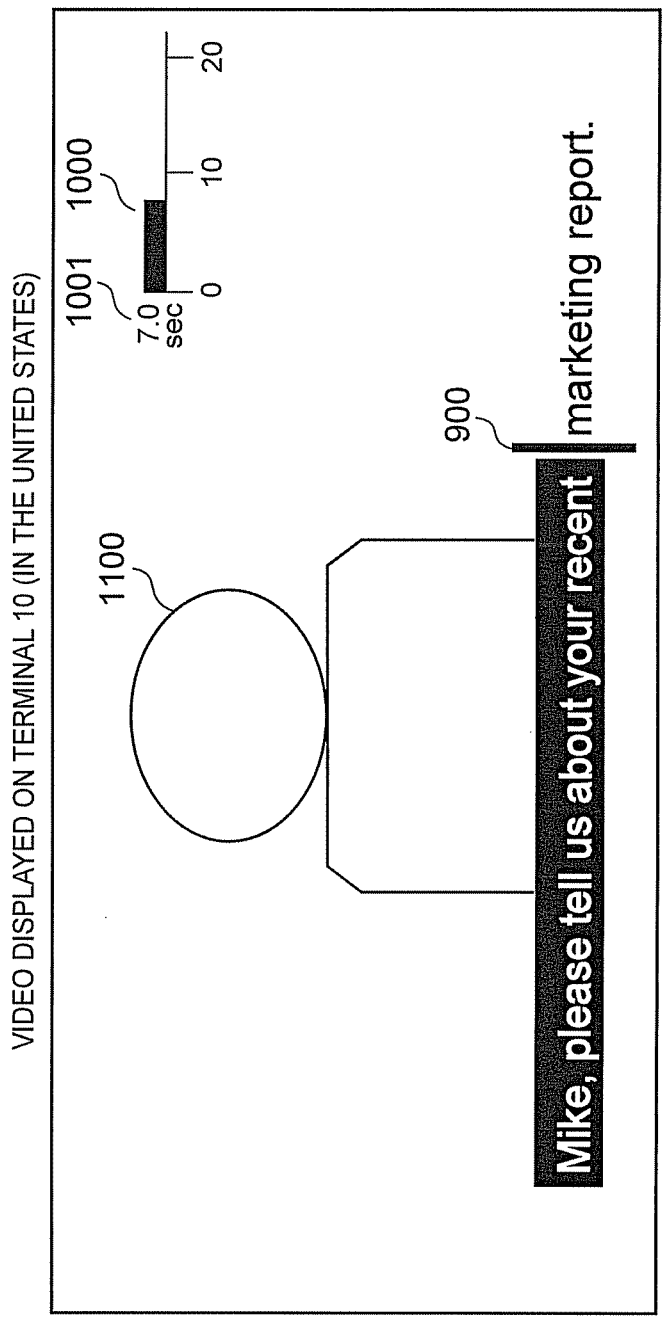
FIG. 11 is a figure illustrating delay information video in a caption format of karaoke-type in the conference support apparatus according to the first embodiment.

A modification of the visualization method according to the first embodiment will be explained. In this modification, the terminal 11 in Japan has a video input unit (not shown) for taking a video of attendances. The delay information video generation unit 123 generates, as a display information video, a video obtained by overlaying the caption data onto the video taken by the input unit. FIG. 11 shows an example of display. A person video 1100 is a video of an attendance in Japan, and the caption data are displayed in the Karaoke-type caption format explained above. In addition, the amount of delay is also displayed in the time bar format. In a conference between three or more terminals, the delay of each terminal may be different. In such case, the following visualization method may also be possible. In the Karaoke-type caption format, a plurality of border lines may be displayed in the same caption data, and a name identifying a terminal is attached to each border line. Further, a plurality of time bars may be displayed.

Second Embodiment

Figure 12:
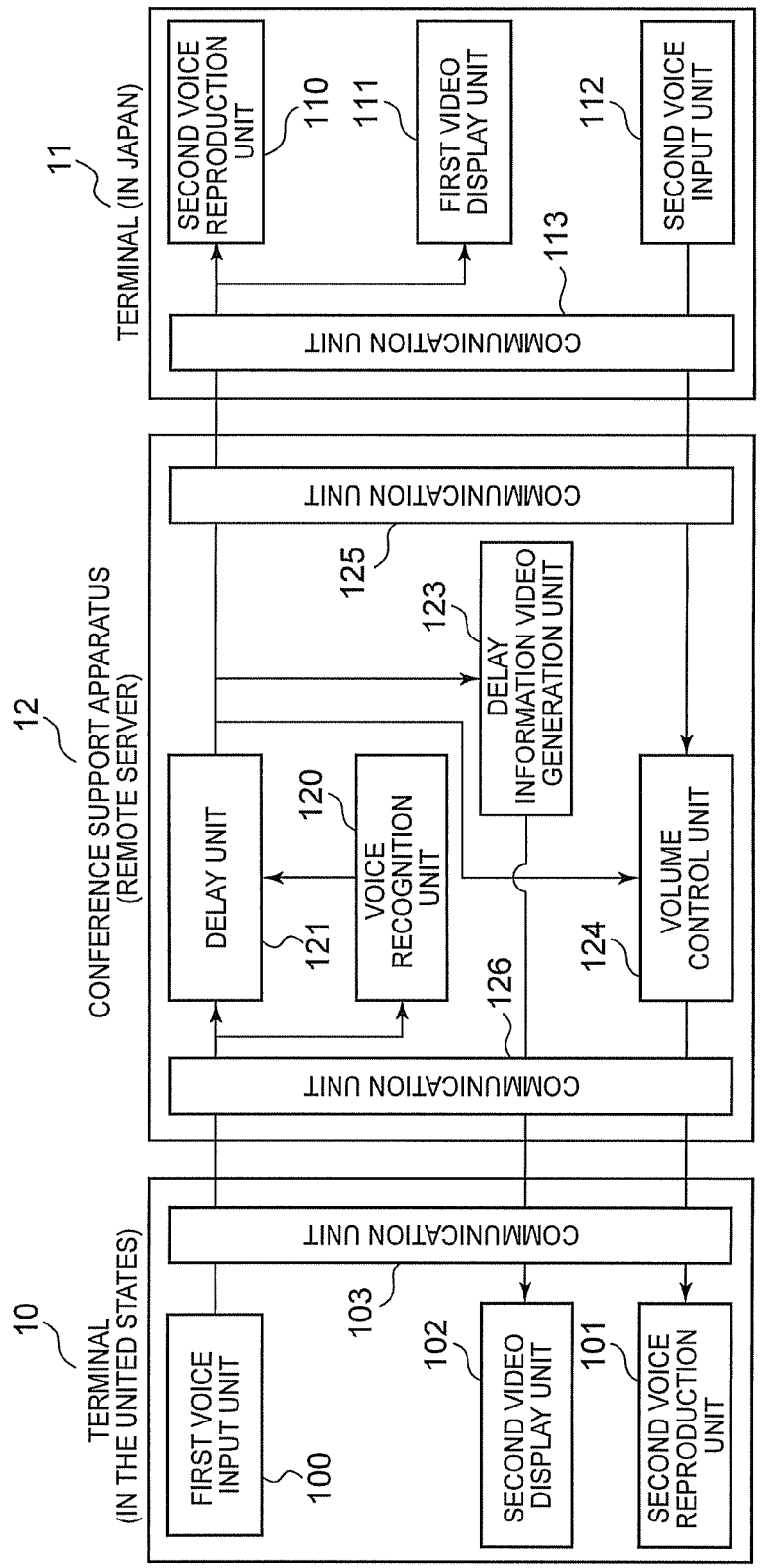
FIG. 12 a block diagram illustrating a configuration of a conference system according to a second embodiment.

FIG. 12 a block diagram illustrating a configuration of a conference system according to the second embodiment. The second embodiment is different from the first embodiment in that a conference support apparatus 12 provided in a remote server in the second embodiment additionally includes a volume control unit 124. The volume control unit 124 controls the volume of voice data in Japan (second voice data) to be transmitted to the United States, in accordance with delay information output from a delay unit 121.

Operation of the conference system according to the second embodiment having the above configuration will be explained.

Figure 13:
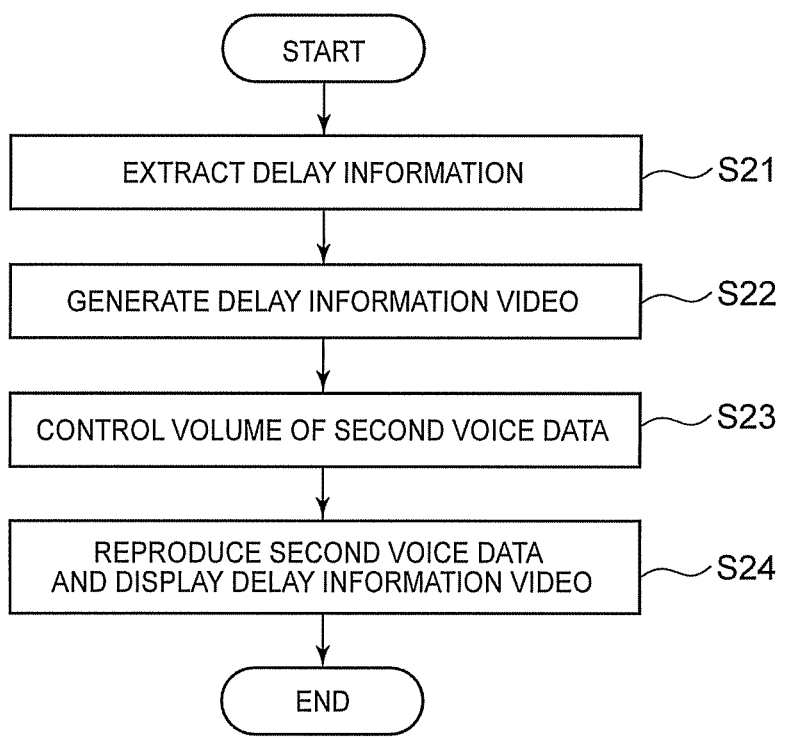
FIG. 13 is a flowchart illustrating an overall flow of processing performed by the conference system according to the second embodiment.

FIG. 13 illustrates a flow of processing when the terminal 10 in the United States displays delay information such as the amount of delay caused by the voice recognition in the second embodiment. Steps S21, S22, and S24 are the same as steps S7, S8, and S9, respectively, in the conference system according to the first embodiment, and therefore, description thereabout is omitted.

The volume control unit 124 uses the delay information output by the delay unit 121 to control the volume of the second voice data transmitted to the United States (step S23). When the attendances in the United States listen to the second voice data while a large delay is occurring in Japan, the following problem may occur. If unconscious reactions of the attendances in Japan (such as "uh-huh" and "yeah") in response to the greatly delayed first voice data are transmitted to the United States, the attendances in the United States are confused. Therefore, when the current amount of delay included in the delay information is determined to be equal to or more than seconds, the volume control unit 124, the volume (magnitude) of the second voice data transmitted to the United States is reduced to zero, so that this prevents reproduction of unnecessary voice data in the United States. The current amount of delay can be calculated from the expression (5) that is used to display the amount of delay in the time bar format. For example, when the amount of delay is determined to be 10 seconds or more, the volume of the second voice data can be controlled to be reduced to zero. Instead of reducing the volume to zero, the volume may be controlled so that the volume is reduced in inverse proportion to the amount of delay.

As described above, in the conference system according to the second embodiment, the volume of the second voice data transmitted to the United States is controlled according to the amount of delay caused by the voice recognition in Japan. This prevents the terminal 10 from reproducing unnecessary delayed voice data, and the conference proceeds smoothly.

According to the conference support apparatus of at least one of the embodiments described above, the information extraction processing enables the attendances at the conference to find the delay information such as the amount of delay occurring at the other party in the conference. Therefore, the attendances at the conference can check the situation of the other party in the conference, and the conference proceeds smoothly.

Several embodiments of the present invention have been hereinabove explained. However, these embodiments are presented as examples, and are not intended to limit the scope of the invention. These new embodiments can be embodied in various other forms, and various kinds of omissions, replacements, and changes can be made without deviating from the gist of the invention. These embodiments and the modifications thereof are included in the scope and the gist of the invention, and are included in the invention described in the claims and the scope equivalent thereto.

What is claimed is:

1. A conference support apparatus for supporting a conference held between at least two terminals, comprising:
    a delay unit configured to delay first voice data obtained by one of the terminals, in accordance with a delay caused by an information extraction processing performed on the first voice data; and
    a delay information video generation unit configured to generate a delay information video obtained by visualizing information about the delay of the first voice data that is delayed by the delay unit.

2. The apparatus according to claim 1,
    wherein the information extraction processing includes voice recognition processing, and
    the delay unit delays the first voice data in accordance with a delay caused by generation of caption data in the voice recognition processing.

3. The apparatus according to claim 2,
    wherein the delay information video generation unit obtains the caption data generated by a voice recognition unit, and generates, as a delay information video, a video showing a reproduction portion of the first voice data in a video of the caption data.

4. The apparatus according to claim 1,
    wherein the delay information video generated by the delay information video generation unit is a video representing change of an amount of delay of the first voice data in time.

5. The apparatus according to claim 4,
wherein the delay information video generated by the delay information video generation unit represents an amount of delay of the first voice data as a length of a predetermined section.

6. The apparatus according to claim 1, further comprising:
a volume control unit configured to reduce a volume of second voice data obtained by a terminal which is different from the terminal obtained the first voice data, in accordance with a amount of delay of the first voice data.

7. A conference support method for supporting a conference held between at least two terminals, comprising:
delaying first voice data obtained by one of the terminals, in accordance with a delay caused by an information extraction processing performed on the first voice data by a delay unit; and
generating a delay information video obtained by visualizing information about the delay of the first voice data that is delayed by the delay unit.

8. The method according to claim 7, further comprising:
delaying the first voice data, in accordance with a delay caused by generation of caption data in a voice recognition processing, wherein the information extraction processing includes the voice recognition processing.

9. The method according to claim 8, further comprising:
obtaining the caption data, generated in the voice recognition processing; and
generating a video showing a reproduction portion of the first voice data in a video of the caption data, as a delay information video.

10. The method according to claim 7,
wherein the generated delay information video is a video representing change of an amount of delay of the first voice data in time.

11. The method according to claim 10,
wherein the generated delay information video represents an amount of delay of the first voice data as a length of a predetermined section.

12. The method according to claim 7, further comprising:
reducing a volume of second voice data obtained by a terminal which is different from the terminal obtained the first voice data, in accordance with a amount of delay of the first voice data.

13. A conference support system for supporting a conference held between a first terminal and a second terminal, comprising:
a first voice input unit configured to obtain first voice data;
a voice recognition unit configured to recognize the first voice data obtained by said first voice input unit, and to generate caption data of the first voice data;
a delay unit configured to delay the first voice data, according to the delay caused by the voice recognition, for correcting a synchronization between the caption data and the first voice data;
an extract unit configured to extract delay information including a amount of delay of the first voice data; and
a delay information video generation unit configured to generate a delay information video that is made by visualizing the delay information extracted by said extract unit.

14. The conference support system according to claim 13,
wherein said delay unit of the conference support system is provided in a remote server, said first voice input unit is provided in the first terminal and the obtained first voice data in the first terminal is transmitted via a communication unit to the remote server.

15. The conference support system according to claim 13,
wherein said delay unit, said extract unit and said delay information video generation unit of the conference support system are provided in the first terminal and the delay information video is displayed at the first terminal.

16. The conference support system according to claim 13,
wherein said delay unit, said extract unit and said delay information video generation unit of the conference support system are provided in the second terminal and the delay information video generated by said delay information video generation is transmitted to the first terminal and the transmitted delay information video is displayed at the first terminal.

17. The conference support system according to claim 13,
wherein the first voice data is delayed by buffering the voice data, and a pair of the buffered voice data and the generated caption data which corresponds to the first voice data are generated.

18. The conference support system according to claim 17,
wherein the first voice data is reproduced in the second terminal and the caption data is displayed in the second terminal.

19. The conference support system according to claim 18,
wherein a second voice data input in the second terminal is transmitted to the first terminal so that the second voice data is reproduced at the first terminal.

20. The conference support system according to claim 19,
wherein the delay information video, which visuals the delay information, is displayed at the first terminal.

* * * * *